United States Patent [19]

Asai et al.

[11] 4,216,892
[45] Aug. 12, 1980

[54] DEVICE FOR MANUFACTURING STATOR CORES

[75] Inventors: Koichi Asai; Tohsuke Kawada, both of Aichi; Yoshiyuki Iwaki; Ryozo Kuroda, both of Hyogo, all of Japan

[73] Assignee: Mitsubishi Denki Kabushiki Kaisha, Tokyo, Japan

[21] Appl. No.: 923,399

[22] Filed: Jul. 10, 1978

[51] Int. Cl.$^2$ ............................................. H02K 15/02
[52] U.S. Cl. ............................. 228/44.1 R; 228/47; 29/33 T; 29/596; 29/609
[58] Field of Search ............... 228/44.1, 47; 29/596, 29/605, 609, 33 T

[56] References Cited

U.S. PATENT DOCUMENTS

| | | | |
|---|---|---|---|
| 3,062,267 | 11/1962 | Hart et al. | 72/142 |
| 3,152,629 | 10/1964 | Rediger | 72/142 |
| 3,206,964 | 9/1965 | Hart et al. | 72/144 |
| 3,283,399 | 11/1966 | Hart et al. | 29/609 X |
| 3,420,469 | 1/1969 | Lewis et al. | 29/605 |
| 3,842,493 | 10/1974 | Ohuchi et al. | 29/596 |

*Primary Examiner*—Carl E. Hall
*Assistant Examiner*—K. J. Ramsey
*Attorney, Agent, or Firm*—Wenderoth, Lind & Ponack

[57] ABSTRACT

Four carriers are disposed at 90° intervals about the axis of rotation. A wound core formed on a mandrel is shifted to one of the carriers contacted with the mandrel. The carrier with the core is rotated through 90° to reach a compression unit and the core is compressed through the movement of the carrier toward the unit, after which the compressed core is welded. When the carrier with the completed core faces a discharge channel through its intermittent rotation, the carrier moves into the channel. Then the carrier ascends to leave the core in the channel and is then rotated to oppose to the mandrel to repeat the above process. The remaining carriers are similarly operated.

8 Claims, 10 Drawing Figures

DEVICE FOR MANUFACTURING STATOR CORES

BACKGROUND OF THE INVENTION

This invention relates to a device for manufacturing stator cores for small-sized electric generators, for example, automobile generators.

It is generally well known that stator cores for small-sized electric generators such as automobile generators have been previously manufactured by stamping a plurality of magnetic sheets into annular discs, superposing the stamped discs on one another to a predetermined thickness and fixing the resulting stack into a unitary structure through welding or rivetting. However, to stamp the magnetic sheets into annular discs has resulted in both an extremely low coefficient of utilization and poor economy, because those portions stamped out to form the central opening and stamped out to form the exterior of the annular discs of the magnetic sheets are not used for the stator core and are not usable for other purposes. Also, as each of the magnetic sheets is relatively thin, it has been difficult to automatically superpose the stamped annular magnetic discs on one another to predetermined thicknesses and to automatically fix a stack of the superposed annular discs as by welding.

Therefore, upon manufacturing the stator cores as above described, it is desirable to provide methods for attempting to achieve the effective utilization of all of the magnetic material and the automation of the core manufacturing operation. Such manufacturing methods have been alreadily known. According to one such manufacturing method, the longitudinal edges of magnetic strips are suitably notched and the notched magnetic strips are successively wound into circular spirals with the notches directed radially inwardly thereof while the strips are cut into predetermined lengths to form separate magnetic cores. Then the magnetic cores are successively compressed and welded into unitary structures thereby to manufacture automatically stator cores one after another.

There have been already known a device for manufacturing stator cores according to the method as above described. However, this device for manufacturing stator cores has been disadvantageous in that an increase in work efficiency can not be expected and the device itself becomes large-scaled.

Accordingly it is an object of the present invention to provide a new and improved device for automatically manufacturing stator cores by successively subjecting successively and effectively wound magnetic cores to predetermined working operations to thereby increase working efficiency while the device is rendered small-sized.

SUMMARY OF THE INVENTION

The present invention provides a device for manufacturing a stator core comprising, in combination, a rotary member intermittently rotated about an axis of rotation, at least one movable carrier supported by the rotary member to be movable radially of the axis of rotation outside of the rotary member, a plurality of working means disposed at predetermined angular positions around the rotary member to dispose a wound magnetic core on the carrier, and to subject the wound magnetic core on the carrier to predetermined working treatments at the predetermined angular positions in cooperation with the radial movement of the carrier.

BRIEF DESCRIPTION OF THE DRAWINGS

The present invention will become more readily apparent from the following detailed description taken in conjunction with the accompanying drawings in which:

FIGS. 1a-1e are enlarged fragmental views of portions of the magnetic strip as it appears at corresponding points, A-E in FIG. 1;

FIG. 3 is a sectional view taken along the line III---III of FIG. 2 and a side elevational view of the core discharge unit shown in FIG. 2 as viewed in the direction of the arrow III illustrated in FIG. 2 with parts illustrated in elevation;

Throughout the Figures like reference numerals designate identical or corresponding components.

DESCRIPTION OF THE PREFERRED EMBODIMENTS

Figure 1:
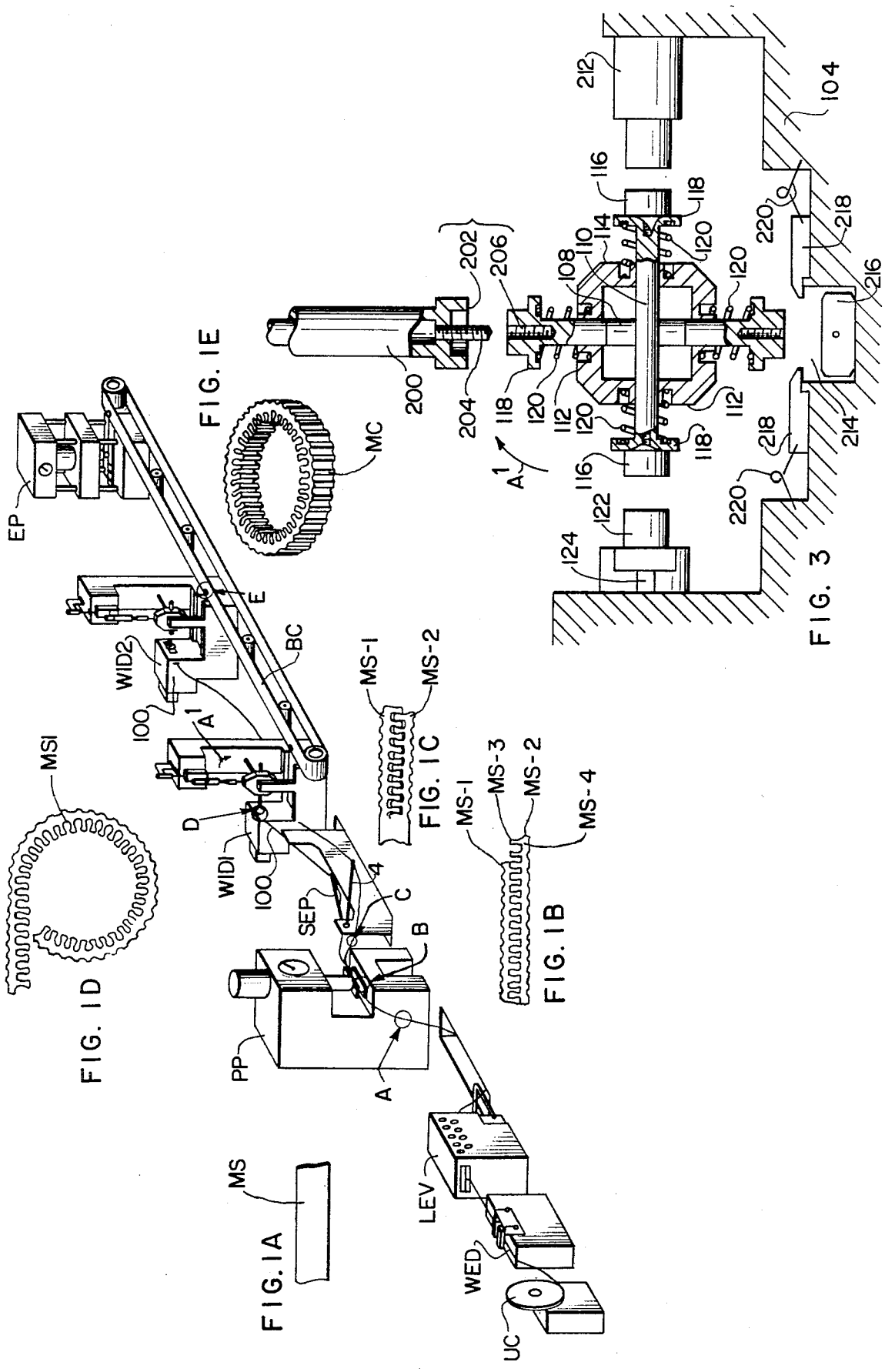
FIG. 1 is a schematic perspective view of an apparatus for manufacturing successively stator cores from a magnetic strip in accordance with the principles of the present invention with all manufacturing units illustrated in the order of the manufacturing steps.

Referring now to FIG. 1 of the drawings, there is illustrated an apparatus for successively manufacturing stator cores of a unitary structure for small-sized electric generators, for example automobile generators, from a magnetic strip. The arrangement illustrated shows all the manufacturing steps starting with the uncoiling of a roll of a magnetic strip and terminating at the completion of the stator core and comprises an uncoiler UC carrying a roll of magnetic strip and a welder WED through which that portion of the magnetic strip MS drawn out from the uncoiler UC passes. The welder WED normally permits the magnetic strip to pass therethrough without any effect and is operative only to weld the tailing edge of the preceding magnetic strip drawn out from the uncoiler UC to a leading edge of a roll of magnetic strip newly mounted on the uncoiler UC to form a continuous strip. The magnetic strip MS leaving the welder WED enters a leveller LEV which corrects distortions caused on the strip as drawn out from the uncoiler UC to render the strip flat. The magnetic strip MS passes from the leveller LEV in a freely drooping state to a punch press PP.

In FIG. 1a, there is illustrated in an enlarged plan view one portion of the magnetic strip MS before it enters the punch press PP at point A of FIG. 1.

As shown in FIG. 1b, the magnetic strip MS passes through the punch press PP and is longitudinally split into a pair of continuous strip portions MS-1 and MS-2, each including a series of teeth MS-3 disposed at substantially equal intervals thereon and meshing with a series of similar teeth MS-3 disposed on the other strip portion and a longitudinal edge portion MS-4 integrally supporting the associated teeth MS-3 and provided on the outer edge with a series of notches located also at substantially equal intervals for a purpose as will be apparent hereinafter. It will readily be understood that both series of teeth MS-3 are simultaneously punched in meshing relationship with both series of notches.

The split magnetic strip portions MS-1 and MS-2 are moved from the punch press PP toward a separator SEP including a pair of separating arms divergent in a V shape so that both strip portions pass over free ends of the arms. Thus the teeth on each of the magnetic strip portions MS-1 or MS-2 on the outgoing side of the punch press PP are more or less separated from those on the other strip portion MS-2 or MS-1, respectively, as shown in FIG. 1c and after having left the separating arms, both magnetic strip portions MS-1 and MS-2 are maintained fully separated from each other.

Subsequently the magnetic strip portions MS-1 and MS-2 thus separated enter a pair of first and second winders WID1 and WID2 respectively tandemly disposed on an extention of the strip run. The first and second winders WID1 and WID2 are identical in both construction and operation. After having passed through a guide portion 100 on each winder, the respective magnetic strip portion is successively wound into spirals with the teeth MS-3 radially inwardly directed as shown in FIG. 1d and cut into predetermined lengths to form half-finished magnetic cores one after another. Then the magnetic cores in the form of the thus formed stacked structure are successively compressed and welded into rigid structures resulting in stator cores such as shown by the reference characters MC in FIG. 1e. As shown, the stator core MC includes a radially inner periphery having slots alternating with poles formed of the teeth of axially disposed convolutions of the magnetic strip portion, the teeth being axially aligned with those on adjacent convolutions, and a radially outer periphery having therein notches disposed at substantially equal angular intervals. The notches are effective for intimately contacting each strip convolution with the adjacent strip convolutions.

The stator cores MC from each of the winders WID1 or WID2 are successively discharged to an endless belt type conveyor BC disposed to abut against one side, in this case the righthand side as viewed in FIG. 1, of the winders WID1 and WID2 and are carried to a forming press EP. In the forming press EP each of the stator cores is again compressed to increase the accuracy of its axial dimension thus resulting in the completion of the stator core.

Figure 2:
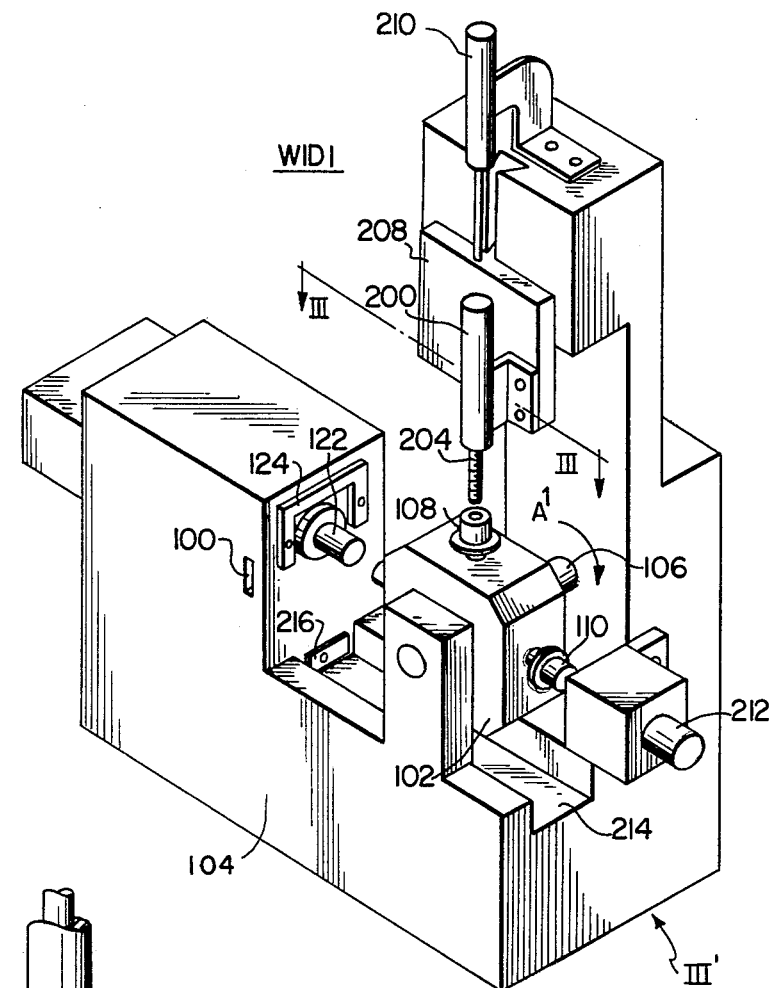
FIG. 2 is an enlarged perspective view of first winder shown in FIG. 1.

Referring now to FIG. 2, there is illustrated the first winder WID1 as shown in FIG. 1 embodying the principles of the present invention. Also FIG. 3 shows a cross sectional view of the first winder as taken along the line III—III of FIG. 1 combined with a side elevational view of a core discharge unit as viewed in the direction of the arrow III' in FIG. 2 only for the purpose of simplifying the description. As above described, the first and second winders WID1 and WID2 are of the same construction and one of them, for example, the first winder WID1 will now be described in detail with reference to FIGS. 2 and 3.

The arrangement illustrated comprises an intermittently rotary member 102 in the form of a square hollow prism including closed opposite ends, four longitudinal edges chamfered and a pair of opposite trunnions rigidly secured to the centers of the closed ends. The rotary member 102 is supported through the trunnions by a pair of opposite upright pedestals extending from a horizontally disposed rectangular base 104 for the winder WID1 on the front and rear sides as viewed in FIG. 2. The rotary member 102 is adapted to be intermittently rotated, in the direction of the arrow A' shown in FIG. 2 about the axis of rotation 106 lying on common axis of the trunnions, in incremental angles of 90 degrees.

The rotary member 102 further includes a pair of operating rods 108 and 110 slidably extending through respective pairs of opposite lateral surfaces 112 and 114, rods 108 and 110 being orthogonal to each other as best shown in FIG. 3. Each of the operating rods 108 or 110 includes a middle portion having a flat recess extending a distance sufficient to permit each rod 108 or 110 to be moved longitudinally thereof or radially of the axis of rotation 106. Also each operating rod 108 or 110 includes opposite ends connected to respective cylindrical carriers 116 which are identical to each other. Each cylindrical carrier 116 is provided on that end surface facing the rotary member 102 with a retaining disc 118 greater in diameter than the carriers 116, and a helical spring 120 is spanned between the retaining disc 118 and an annular retaining groove disposed on that lateral surface of the rotary member 102 opposite thereto and around that portion of the mating operating rod 108 or 110 projecting beyond the associated lateral surface of the rotary member 102. All the helical springs 120 are substantially equal in spring force to one another to maintain the carriers 116 substantially equidistant from the lateral surfaces 112 and 114 of the rotary member 102 adjacent thereto.

As shown in FIG. 2, another upright pedestal on the base 104 provided with the guide port 100 includes a mandrel 122 extending toward the opposite carrier 116 to form normally a predetermined spacing therebetween and to be aligned with that operating rod which is horizontally located, in this case the rod 110, and a fluid operated cylinder 124 to form one working unit for successively forming wound magnetic cores of the magnetic strip. The mandrel 122 is equal in diameter to the carrier 116.

Also as best shown in FIG. 3 a holder 200 is disposed directly above the carrier 116 connected to the upper end as viewed in FIG. 3 of that operating rod which is vertically located, in thise case the rod 108, and includes a lower end portion 202 formed into a cylindrical recess, so dimensioned as to just fit over the opposite carrier 116, and a male screw 204 extending downward from the center of the recess. When lowered, the male screw 204 is able to be screw threaded into a female screw 206 disposed on each of the carriers 116 when located below the recess 202 with a predetermined spacing formed therebetween.

As shown in FIG. 2, the holder 200 is fixedly secured to a mounting plate 208 which is, in turn, movable vertically by a fluid operated cylinder 210 such as an air cylinder fixed to the top of the upright pedestal extending from the rear side as viewed in FIG. 2 of the base 104.

The components 200 through 210, with the carrier 116 which is opposed to the holder 200, forms another working unit for compressing the wound magnetic core. Also the magnetic core is welded into a rigid structure while being maintained compressed.

As shown in FIGS. 2 and 3, a fluid operated cylinder 212, for example, an air cylinder is fixedly secured to the same pedestal as the air cylinder 210 to be opposite to the carrier 116 connected to the horizontally located operating rod 110 or 108 with a predetermined spacing formed therebetween.

The air cylinder 212 serves to push the opposite carrier 116 to move the associated operating rod toward the mandrel 122 until the carrier 116 connected to the opposite end of the moved rod abuts against the mandrel 122.

As best shown in FIG. 3, the base 104 is provided on that surface thereof opposite to the rotary member 102 with a core discharge channel 214 at a position directly below the lower carrier 116 as viewed in FIG. 3, on the vertically located operating rod, in this case the rod 108, so as to be parallel to the operating rod 110 which is horizontally located. The channel 214 includes an open end operatively coupled to the conveyor BC (see FIG. 1) and another end terminating at a fluid operated cylinder 216 such as an air cylinder disposed on the same pedestal as the air cylinder 124. The channel 214 is so dimensioned that it can readily discharge the completed stator core to the endless belt type conveyor BC (not shown in FIG. 3). As shown in FIG. 3, a pair of pawls 218 are disposed in opposite relationship on both sides of the channel 214 and below the lowermost carrier 116. The pawls 218 are normally biased toward the channel 214 by means of the action of respective springs 220 to overhang the latter.

The components 214 through 220 form still another working unit with the lowermost carrier 116 to discharge the completed stator core to the endless belt type conveyor BC (see FIG. 1).

From the foregoing it is seen that the core forming unit 122–124, the compressing and welding unit including the holder 200, and the male screw 204, the air cylinder 212 and the discharge channel 214 are disposed at substantially equal angular intervals of 90 degrees around the rotary member 102 to occupy their predetermined angular positions about the axis of rotation 106. The rotary member 102 is intermittently rotated about the axis of rotation 106 with incremental angles of 90 degrees so that one of the operating rod 108 or 110 has both carriers 116 thereof normally opposite to the mandrel 122 and the air cylinder 212 respectively while the other operating rod or 110 or 108 has both carriers 116 thereof normally opposite to the holder 200 and the discharge channel 214 respectively.

Under these circumstances, each carrier 116 forms a predetermined spacing between the same and the opposite component and is at its inoperative position. Also it will be stated hereinafter that the carriers 116 shown in FIG. 3 are in their balanced position.

The operation of the arrangement shown in FIGS. 2 and 3 will now be described in conjunction with FIGS. 4 and 5 which are similar to FIG. 3, but with three wound cores illustrated at different positions.

With all the carriers 116 maintained in their balanced positions shown in FIG. 3, the magnetic strip (not shown in FIG. 3) is wound in a spiral around the mandrel 122 to form a wound magnetic core (not shown) as above described in conjunction with FIG. 1. Then the air cylinder 212 is operated to push its piston against the opposite carrier 116 until the carrier 116 connected to that end of the operating rod 110 remote from the air cylinder 212 abuts against the mandrel 122 as shown in FIG. 4.

At that time, the air cylinder 210 is operated to lower the male screw 204 while the latter is prevented from rotating. Thus the vertically located operating rod 108 is lowered until the lower carrier 116 connected to the lowered rod as viewed in FIG. 3 of the operating rod 108 moves the opposite pawls 218 away from each other against the action of the springs 220 to reach the discharge channel 214.

Under these circumstances, the air cylinder 124 is operated to shift the wound core 230 from the mandrel 122 to the abutting carrier 116.

Then the operating rods 108 and 110 and the air cylinders 124, 210 and 212 are returned back to their original positions shown in FIG. 3. Thus the mandrel 122 forms the spacing with the carrier 116 moved away therefrom and the carrier 116 within the discharge channel 214 leaves the latter. Thereafter the rotary member 102 is rotated through an angle of 90 degrees in the direction of the arrow A' shown in FIG. 3 about the axis of rotation 106 to bring the wound core 230 which was just previously on mandrel 122 below the reccessed end portion 202 of the holder 200, while the operating rod 108 has the carriers 116 thereof opposing to the mandrel 122 and the air cylinder 212.

Subsequently a new core 230 is formed around the mandrel 122 (see FIG. 4) and then the carrier 116 opposite to the mandrel 122 abuts against the latter in the manner as above described after which the core 230 is shifted to that carrier 116. On the other hand, the male screw 204 is again lowered by the air cylinder 210 and rotated by any suitable means until it is screw threaded into the female screw 206 on the carrier 116 now located below the recess 202. That carrier 116 and therefore the vertical operating rod 110 is pulled up until the carrier 116 connected to rod 110 and previously entered into the discharge channel 214 leaves the latter. Simultaneously, the core 230 carried by the pulled carrier 116 is compressed between the recess 202 on the holder 200 and the retaining disc 118 connected to the same carrier. The core 230 is maintained compressed and is subjected to arc welding in an atmosphere of an inert gas, for example argon, resulting in the completion of a static core. FIG. 5 shows the magnetic core 230 being arc-welded as indicated by the reference numeral 232 and a core 230 now wound around the mandrel 122 and shifted to the cylindrical member 116 abutting against the latter.

Then the male screw 204 is reversely rotated to disengage from the female screw 206 and the operating rods 108 and 110 and the air cylinders 124 and 210 are returned back to their original positions illustrated in FIG. 3.

Following this the rotary member 102 is rotated in the clockwise direction as viewed in FIG. 3 about the axis of rotation 106 to shift the stator core 230 from its position opposing to the holder 200 to its position facing the air cylinder 212.

At the same time, another magnetic core carried by the next succeeding carrier 116 comes below the holder recess 202 and is compressed and welded as above described, while the previously welded stator core 230 remains in its position opposed to the cylinder 212 piston. Also still another magnetic core is formed around the mandrel 122.

Subsequently the process as above described is repeated to bring the stator core 230 facing the air cylinder 212 into its position above the discharge channel 214. Also still another core as above described comes below the holder recess 202, and another compressed and welded stator core faces the air cylinder 212. Then, when the operating rod now vertically located is lowered by the male screw 204, its lower carrier member 116 forcedly moves the pair of opposite pawls 218 away from each other until that carrier 116 with the stator core 230 disposed therearound enters the discharge channel 214 and the mating retaining disc 118 is sandwiched between the pawls 218 as shown in FIG. 4. Thereafter, upon pulling up the vertically located, operating rod as above described, the stator core 230 is retained in the discharge channel 214 by means of the action of pawls 218. At that time, the air cylinder 216 is operated to discharge the stator core 230 to the endless belt type conveyor BC (see FIG. 1).

Then the carriers 116 are returned back to their balanced positions and the rotary member 102 is rotated through an angle of 90 degrees. At that time one working cycle is completed as above described, and the stator core 230 is in the discharge channel 214 by the action of the pawls 218. At that time, the air cylinder 216 is operated to discharge the stator core 230 to the endless belt type conveyor BC (see FIG. 1).

Thereafter the process as above described is repeated to subsequently discharge further stator cores to the conveyor BC as shown in FIG. 1.

It will readily be understood that the second winder WID2 discharges stator cores to the conveyor BC one after another.

Then the stator cores are successively conveyed to the forming press EP by the conveyor BC for forming purpose.

Figure 5:
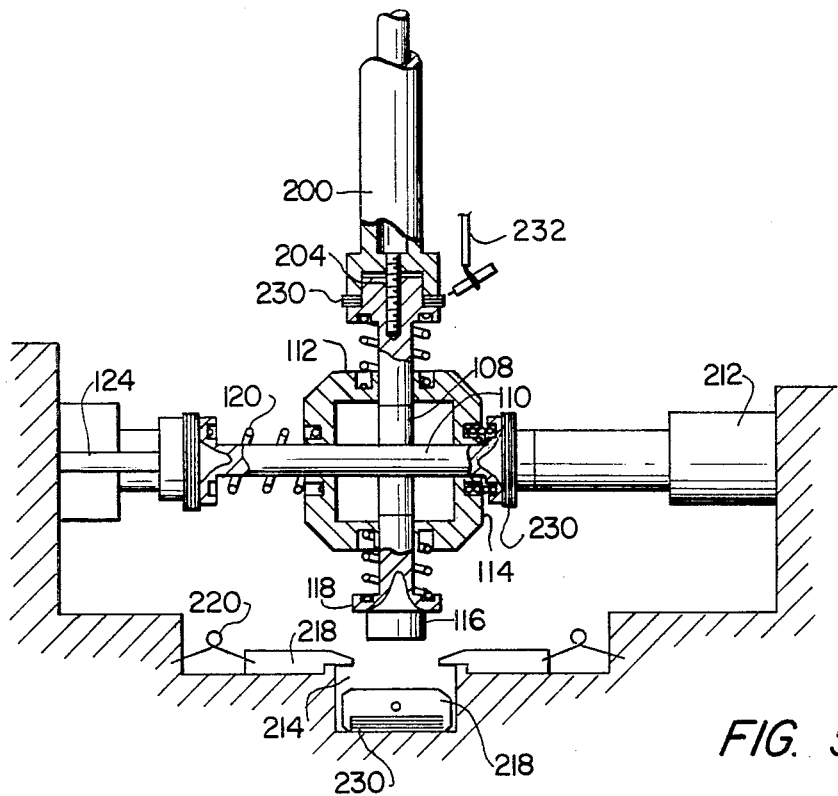
Figure 6:
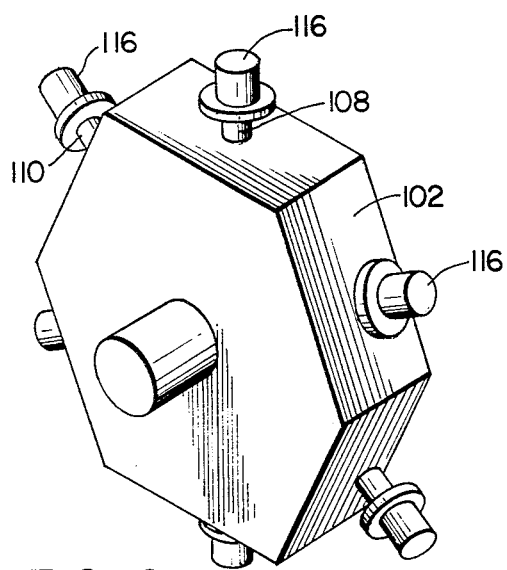
FIGS. 6 through 10 are views illustrating different modifications of the intermittently rotary member and the associated components shown in FIGS. 2, 3 and 4.

While the present invention has been illustrated and described in conjunction with the rotary member in the form of a substantially square prism including a pair of orthogonal operating rods it is to be understood that the rotary member 102 may be in the form of a substantially regular hexagonal prism as shown in FIG. 6. Then three operating rods (only two of which are designated by the reference numerals 108 and 110 in FIG. 6) are disposed at equal angular intervals of 60 degrees and slidably extended through respective pairs of opposite lateral surfaces of the hexagonal prism. In other respects, the rotary member is substantially identical to that shown in FIGS. 2 through 5.

Figure 4:
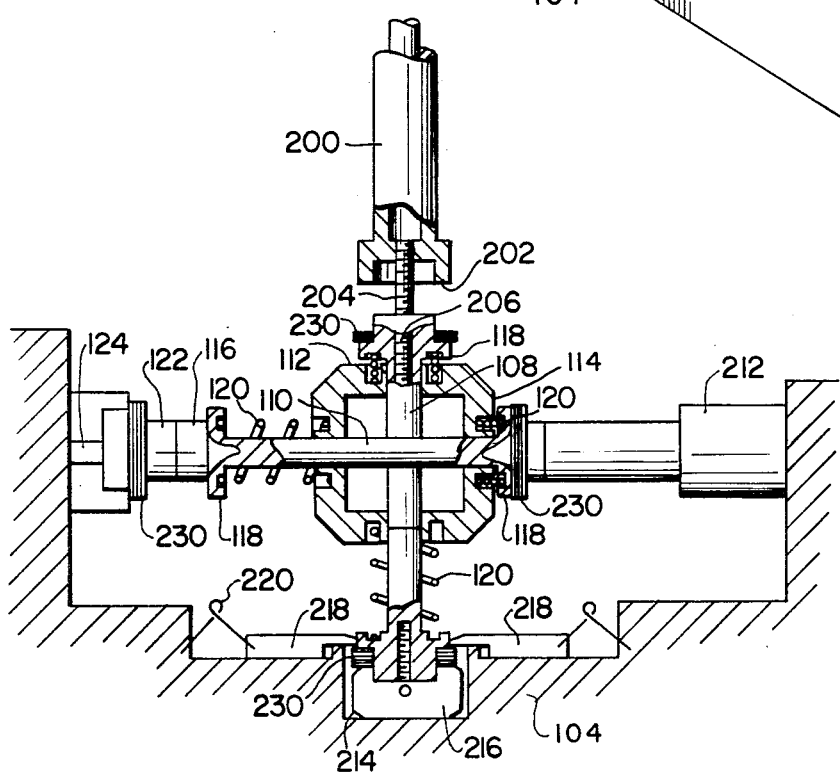
FIGS. 4 and 5 are views similar to FIG. 3 and useful in explaining the operation of the first winder shown in FIGS. 1, 2 and 3.
Figure 7:
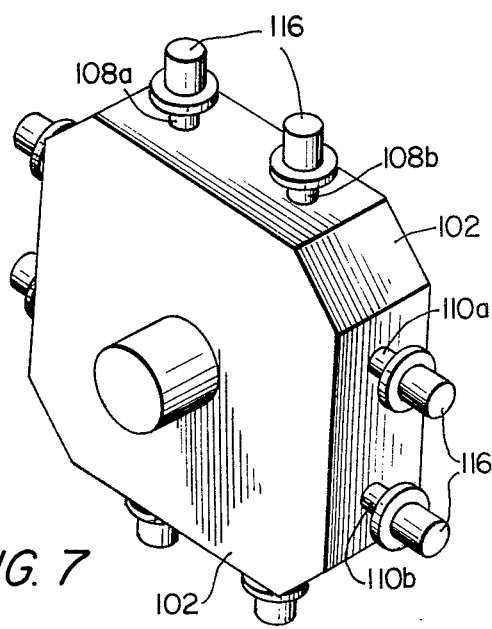

Also the rotary member 102 may be modified as shown in FIG. 7 wherein a pair of spaced parallel rods 108a and 108b or 110a and 110b are substituted for the single operating rods 108 or 110 as shown in FIGS. 3 through 5. In this case, the various components disposed around the rotary member 102 and replicas thereof are disposed to be aligned with the pair of operating rods 108a and 108b or 110a and 110b. In this measure, a pair of split magnetic strip portions can be simultaneously formed into stator cores in the manner as above described in conjunction with FIGS. 2 through 5 resulting in the omission of one of the winders WID1 and WID2.

Figure 8:
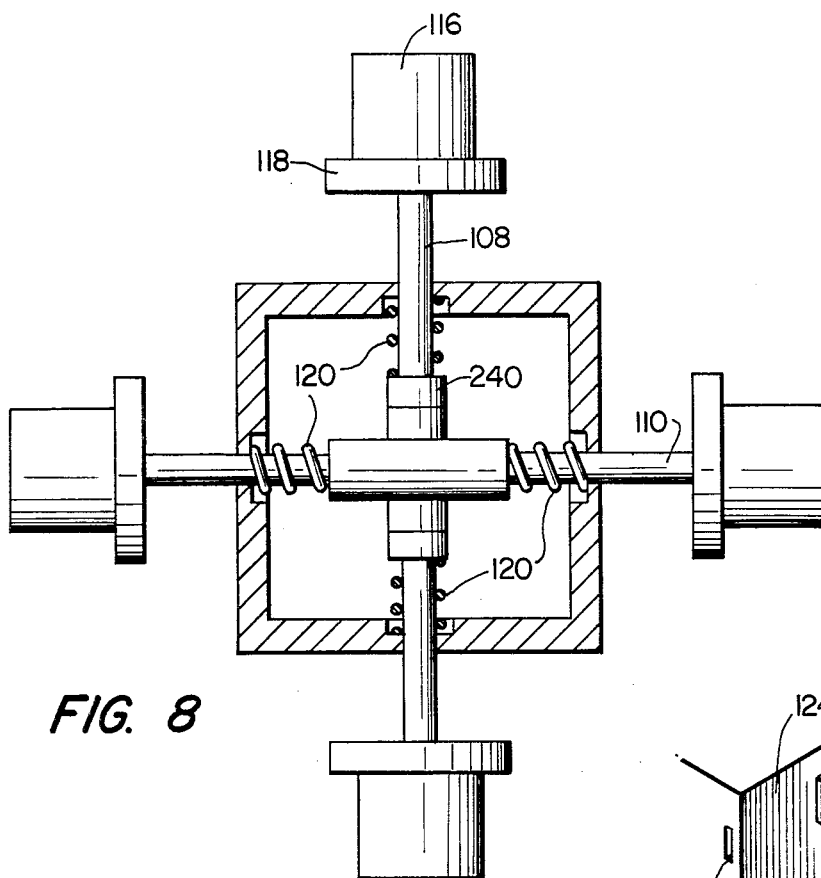

In the arrangement illustrated in FIG. 8 all the springs 120 are disposed inside of the hollow rotary member 102 rather than outside thereof. More specifically, each of the operating rods 108 or 110 includes a central portion having an increased diameter and the flat recess as above described in conjunction with FIG. 3. Then each spring 120 is disposed between each end of the increased diameter portion of the rod 108 or 110 and the adjacent portion of the inner wall surface of the rotary member 102, and around the rod 108 or 110.

Figure 9:
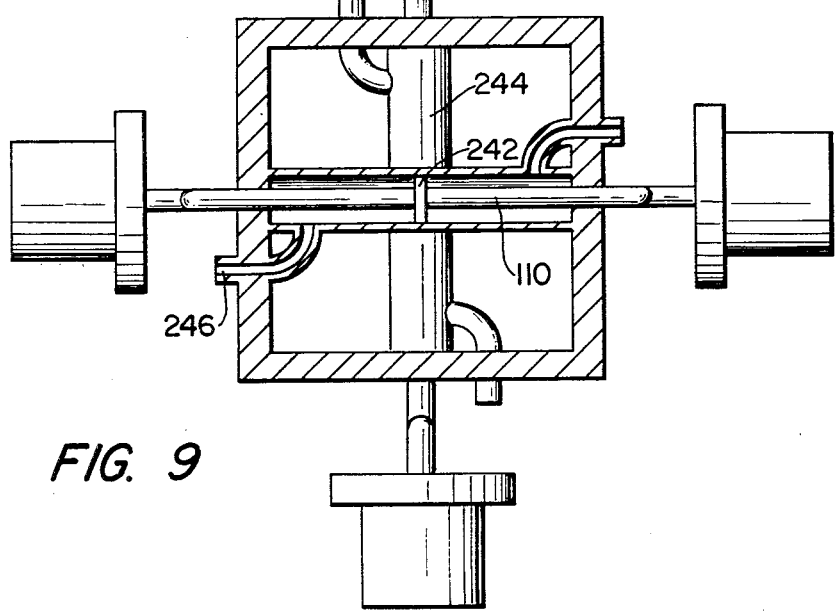

Further the operating rods 108 and 110 may be moved by any suitable fluid operated means such as shown in FIG. 9. In the arrangement illustrated, each of the operating rods 108 or 110 acts as a piston rod connected to a piston 242 movably disposed in an individual fluid operated cylinder 244 having both ends thereof closed by the adjacent portions of opposite inner wall surfaces of the rotary member 102. Then a fluid pipe 246 for a pressurized fluid such as air or an oil extends from adjacent that portion of each closed cylinder end to the exterior of the rotary member 102 and includes a control valve (not shown). The cylinders 244 are normally operated to keep the carriers 116 in their balanced positions as shown in FIG. 3. Either of the control valves can be controlled to move the associated piston 242 and therefore the carriers 116 operatively coupled thereto as required.

Where the arrangement of FIG. 9 is used, the air cylinder 212 is omitted and also the male and female screws 204 and 206 respectively are not required to be disposed on the holder 200 and each carrier 116 respectively because a pressure is applied to that piston 242 connected to the vertically located operating rod to provide a pressure required for the particular magnetic core to be compressed and welded. This simplifies the means for compressing each wound core in the compressing and welding steps. In addition, the arrangement eliminates the necessity of providing the holder 200 for the male screw 204, the mounting plate 208 for the holder 200 and the air cylinder 210 for vertically moving the plate 208.

Figure 10:
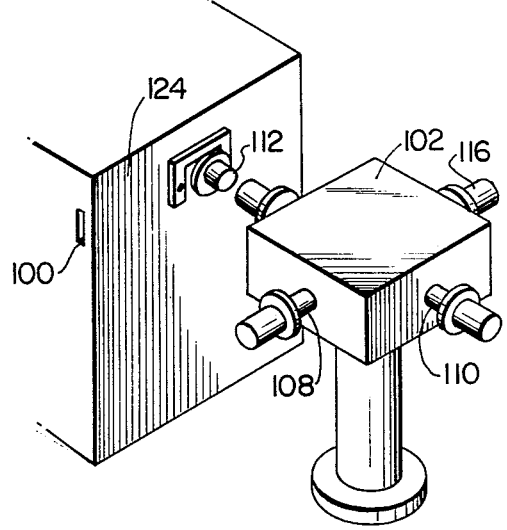

As shown in FIG. 10, the rotary member 102 may be disposed so that the axes of rotation thereof is vertical to the surface of the earth but not horizontal thereto as shown in FIG. 2.

The arrangement of FIG. 10 is advantageous when the disposal and location of the winder itself is limited by the surroundings, such as the height of the ceiling.

From the foregoing it is seen that, according to the present invention, at least one carrier is intermittently rotated about the axis of rotation while the carrier receives a wound magnetic core and moves toward each of a plurality of working units to permit the magnetic core to be subjected to a working treatment as predetermined by that unit whereby a stator core is completed. Therefore the working efficiency can be much increased. Also due to the rotary structure, the present apparatus can be rendered very small-sized.

While the present invention has been illustrated and described in conjunction with a few preferred embodiments thereof it is to be understood that numerous changes and modifications may be resorted to without departing from the spirit and scope of the present invention.

We claim:

1. A device for manufacturing a stator core, said device comprising:

a rotary member mounted to be successively intermittently rotated about a rotational axis, said rotary member having at least four peripheral portions spaced about said rotational axis, said peripheral portions being arranged in pairs of peripheral portions spaced diametrically opposite each other with respect to said rotational axis;

at least two operating rods extending orthogonally of each other through said rotary member, each said operating rod being mounted for reciprocal sliding movement, radially of said rotational axis, through a respective said pair of peripheral portions of said rotary member;

at least four carriers, one each of said carriers being mounted on a respective end of a respective said operating rod at a position exterior of the respective said peripheral portion of said rotary member;

each said operating rod having associated therewith means for normally maintaining said operating rod in a neutral position whereat the said carriers thereof are equally spaced from the respective said peripheral portions of said rotary member;

at least first, second, third and fourth working stations sequentially spaced about said rotary member at positions to be successively confronted by said carriers upon successive intermittent rotation of said rotary member about said rotational axis;

first cylinder means at said third working station for pushing a said carrier at a first end of one of said operating rods extending between said first and third working stations and for moving said one operating rod from the neutral position thereof such that a said carrier at a second end of said one operating rod is moved toward said first working station;

second cylinder means at said first working station for pushing a wound core onto said carrier at said second end of said one operating rod;

third cylinder means at said second working station for pushing a said carrier at a first end of another of said operating rods extending between said second and fourth working stations and for moving said another operating rod from the neutral position thereof such that a said carrier at a second end of said another operating rod is moved toward said fourth working station;

threaded pulling means at said second working station for meshing engagement with said carrier at said first end of said another operating rod and for pulling said operating rod toward said second working station until a wound core positioned on said carrier at said first end of said another operating rod is compressed between said carrier and said third cylinder means;

welding means at said second working station for welding the thus compressed wound core to thereby form a completed stator core;

a completed stator core removal channel located at said fourth working station;

pawl means associated with said removal channel for removing a completed stator core from said carrier at said second end of said another operating rod when said threaded pulling means is operated to pull said another operating rod toward said second working station and for retaining the thus removed completed stator core in said removal channel; and discharge means for discharging said thus removed completed stator core from said removal channel.

2. A device as claimed in claim 1, wherein said rotary member comprises a square prism including four said peripheral portions.

3. A device as claimed in claim 1, wherein said rotary member comprises a hexagonal prism including six said peripheral portions.

4. A device as claimed in claim 1, wherein said rotational axis extends horizontally.

5. A device as claimed in claim 1, wherein said rotational axis extends vertically.

6. A device as claimed in claim 1, wherein said neutral position maintaining means comprises springs acting between each said operating rod and the respective said peripheral portions.

7. A device as claimed in claim 1, wherein said neutral position maintaining means comprises a fluid operated piston-cylinder means.

8. A device as claimed in claim 1, wherein said threaded pulling means comprises a threaded bolt rotatably attached to said third cylinder means and engageable in a threaded opening in the respective said carrier.

* * * * *